(12) United States Patent
Sagberg et al.

(10) Patent No.: US 12,328,548 B2
(45) Date of Patent: Jun. 10, 2025

(54) OPTICAL MICROPHONE SUBSTRATE

(71) Applicant: SENSIBEL AS, Oslo (NO)

(72) Inventors: Håkon Sagberg, Oslo (NO); Jakob Vennerød, Oslo (NO)

(73) Assignee: SENSIBEL AS, Oslo (NO)

( * ) Notice: Subject to any disclaimer, the term of this patent is extended or adjusted under 35 U.S.C. 154(b) by 0 days.

(21) Appl. No.: 18/774,567

(22) Filed: Jul. 16, 2024

(65) Prior Publication Data

US 2024/0373171 A1 Nov. 7, 2024

Related U.S. Application Data

(63) Continuation of application No. 17/775,699, filed as application No. PCT/GB2020/052867 on Nov. 11, 2020, now Pat. No. 12,069,432.

(30) Foreign Application Priority Data

Nov. 11, 2019 (GB) .................................... 1916380

(51) Int. Cl.
  *H04R 23/00*  (2006.01)
  *G01B 11/14*  (2006.01)
  *G01D 5/26*   (2006.01)

(52) U.S. Cl.
  CPC .......... *H04R 23/008* (2013.01); *G01B 11/14* (2013.01); *G01D 5/266* (2013.01)

(58) Field of Classification Search
  CPC .. H04R 23/008; B81B 2201/04; B81B 3/0029
  See application file for complete search history.

(56) References Cited

U.S. PATENT DOCUMENTS

| | | |
|---|---|---|
| 7,440,117 B2 | 10/2008 | Degertekin et al. |
| 2006/0181712 A1 | 8/2006 | Degertekin et al. |

(Continued)

FOREIGN PATENT DOCUMENTS

| | | |
|---|---|---|
| WO | 03049494 A1 | 6/2003 |
| WO | 2019220103 A1 | 11/2019 |

OTHER PUBLICATIONS

International Search Report; European Patent Office; International Application No. PCT/GB2020/052867; Mar. 24, 2021; 7 pages.

(Continued)

*Primary Examiner* — Sunita Joshi
(74) *Attorney, Agent, or Firm* — Taft Stettinius & Hollister LLP

(57) ABSTRACT

An optical microphone assembly including a substrate having a first and second substrate portions with the first substrate portion being thinner than the second substrate portion, an interferometric arrangement including a membrane and at least one optical element including a surface of the first substrate portion and/or is disposed on a surface of the first substrate portion, and the at least one optical element does not include a diffractive optical element formed as a plurality of holes through the first substrate portion. The optical microphone assembly further includes a light source arranged to provide light to the interferometric arrangement such that a first portion of the light propagates along a first optical path via the interferometric arrangement and a second portion of the light propagates along a second different optical path via the interferometric arrangement, thereby giving rise to an optical path difference between the first and second optical paths which depends on a distance between the membrane and the optical element, and with at least one of the first and second paths passing through the first substrate portion, and at least one photo detector arranged to detect at least part of an interference pattern (Continued)

generated by said first and second portions of light dependent on the optical path difference.

20 Claims, 5 Drawing Sheets

(56) References Cited

U.S. PATENT DOCUMENTS

2006/0227845 A1* 10/2006 Degertekin .......... H04R 23/008
  372/102
2011/0194711 A1   8/2011 Avenson et al.
2017/0289703 A1* 10/2017 Bartl ................. G02B 27/4233

OTHER PUBLICATIONS

Written Opinion; European Patent Office; International Application No. PCT/GB2020/052867; Mar. 24, 2021; 11 pages.
Search Report Under Section 17(5); Intellectual Property Office of the United Kingdom; Patent Application No. GB1916380.7; Apr. 29, 2020; 5 pages.
Further Search Report Under Section 17(6); Intellectual Property Office of the United Kingdom; Patent Application No. GB1916380.7; Dec. 16, 2020; 3 pages.

* cited by examiner

OPTICAL MICROPHONE SUBSTRATE

CROSS REFERENCE TO RELATED APPLICATIONS

This application is a continuation of U.S. patent application Ser. No. 17/775,699 filed May 10, 2022, which is a U.S. national stage filing of International Patent Application No. PCT/GB2020/052867 filed Nov. 11, 2020, which claims priority to United Kingdom Patent Application No. 1916380.7 filed Nov. 11, 2019, the contents of each application hereby incorporated by reference in their entirety.

This invention relates generally to optical microphone assemblies and in particular to substrates for optical microphone assemblies.

Microphones are used to convert sound waves into electrical signals, typically by measuring the displacement of a moveable member (e.g. a membrane) that vibrates in response to ambient acoustic vibrations. There are a number of ways of measuring the displacement of such a moveable member, including capacitive readout (commonly called condenser microphones) and electrostatic or electromagnetic readout mechanisms (e.g. dynamic microphones).

An alternative way of reading out the position of a microphone membrane is optical interferometric read out. In typical examples of such systems, a diffraction grating is provided on a substrate adjacent to a membrane, and electromagnetic radiation is directed onto the diffraction grating. A first portion of the light is reflected back from the grating. A second portion is transmitted through the grating, which diffracts the radiation. The diffracted radiation impinges on the membrane, which reflects it onto the grating. The radiation passes through the grating and the two portions of light interfere to create an interference pattern that can be detected by a detector. The interference pattern has a shape (i.e. spatial distribution) matching the diffraction orders of the grating, but the light intensity directed into these diffraction orders depends on the relative phase of the two portions of light, and therefore on the distance between the grating and the membrane. The position (and therefore the movement) of the membrane can thus be determined from changes in the intensity of the light at the detector.

Such microphones have a high signal to noise ratio (SNR) and high sensitivity. However, further improvements in the performance of such microphones are desirable.

When viewed from a first aspect, the invention provides an optical microphone assembly comprising:
  a substrate;
  an interferometic arrangement, the interferometric arrangement comprising a membrane and at least one diffractive optical element spaced from the membrane, wherein the at least one diffractive optical element comprises a plurality of lines formed in or disposed on a surface of the substrate, the plurality of lines being arranged in a first pattern, and wherein the substrate comprises one or more holes extending fully through the substrate, the one or more holes being arranged in a second pattern that is different from the first pattern;
  the optical microphone assembly further comprising:
  a light source arranged to provide light to said interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the diffractive optical element, wherein the one or more holes are positioned such that at least one of said first and second optical paths at least partly overlaps with the one or more holes; and
  at least one photo detector arranged to detect at least part of an interference pattern generated by said first and second portions of light dependent on said optical path difference.

The first aspect of the invention extends to a method of manufacturing an optical microphone assembly, the optical microphone assembly comprising a substrate, a membrane, a light source and at least one photo detector, the method comprising:
  providing at least one diffractive optical element comprising a plurality of lines on a surface of the substrate by forming said plurality of lines in or on the surface, the plurality of lines being arranged in a first pattern;
  forming one or more holes in the substrate, the one or more holes extending fully through the substrate and being arranged in a second pattern that is different from the first pattern;
  providing a membrane spaced from the diffractive optical element so as to form an interferometric arrangement;
  arranging a light source to provide light to said interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the diffractive optical element, wherein the one or more holes are positioned such that at least one of said first and second optical paths at least partly overlaps with the one or more holes; and
  arranging at least one photo detector to detect at least part of an interference pattern generated by said first and second portions of light dependent on said optical path difference.

The Applicant has appreciated that providing one or more holes in the substrate as described above can provide certain advantages over microphone assemblies of the prior art. As the hole(s) at least partly overlap with the optical path taken by the light through the interferometric arrangement, the hole(s) may affect the light that is transmitted by or reflected from the substrate. For example, the hole(s) may remove some of the light that would otherwise have contributed to the diffraction pattern created by the diffractive optical element. It is therefore to be understood that when it is said that at least one of said first and second optical paths at least partly overlaps with the one or more holes, this refers to the optical path(s) that would have been taken by the first and/or second portions of light from the light source to the detector(s) if the hole(s) were not present. The holes may help to improve the performance of the optical microphone assembly, for example, by removing parts of the light that contribute negatively to the optical signal strength and/or contrast.

Another way that the hole(s) may help to improve the performance of the optical microphone assembly is by changing its acoustic properties. For example, the hole(s) may help to reduce acoustical squeeze-film resistance between the membrane and the substrate that may otherwise give rise to noise in the optical microphone output signal. The hole(s) may also help to reduce squeeze-film noise displacement of the substrate, thereby reducing the total measured thermo-mechanical noise in the optical microphone.

Although the hole(s) may affect the light that is transmitted by or reflected from the substrate, it is to be understood that the holes do not form part of the diffractive optical element. In particular, the diffractive optical element is not defined by the hole(s), i.e. the diffractive optical element is not formed by forming the hole(s) in the substrate. The diffractive optical element is diffractive due to comprising lines (e.g. grating lines) arranged in the first pattern. The hole(s) may be described as being uncorrelated with the diffraction pattern produced by the lines of the diffractive optical element. The hole(s) may overlap with the at least one diffractive optical element. For example, in a set of embodiments, the first and second patterns have respective first and second envelopes, wherein the first and second envelopes overlap. At least one, at least some or all of the hole(s) may be positioned within the first envelope.

As noted above, the presence of the hole(s) may advantageously improve the acoustic and/or optical properties of the optical microphone (e.g. by reducing squeeze film resistance and/or removing negative contributions to the optical signal strength/contrast). While the presence of one or more holes may provide such advantages, the benefit may be improved by selecting (e.g. optimising) the properties of the holes. For example, the size, shape, arrangement and/or other properties of the holes may be selected to increase the associated benefits.

The length scale of the one or more holes (e.g. a width or length of the one or more holes) would typically be larger than an average spacing between the lines (e.g. the distance between adjacent lines). For example, the length scale of the one or more holes may be at least 3 times larger, at least 5 times larger, at least 10 times larger, at least 15 times larger or at least 20 times larger than the average spacing between the lines. In some embodiments, a small number of large holes is provided. For example, the number of holes may be between 1 and 8, between 2 and 6 or between 3 and 5.

When it is said that the holes are arranged in a pattern (i.e. the second pattern), it is to be understood that the term "pattern" does not necessarily imply any symmetry or repetition in the arrangement of holes, although the pattern may have symmetry, e.g. rotational, reflectional and/or translational symmetry. The second pattern may comprise one or more of: a single central hole; radially extending elongate holes, e.g. 2, 3, 4, 5, 6, 7, 8, or more than 8 radially extending elongate holes; radially extending lines of holes, e.g. in which a line of two or more holes extends from a centre point or a centre hole; concentric circles of holes, e.g. surrounding a central hole. Other patterns are possible. The hole(s) may be circular.

When it is said that hole(s) extend "fully through" the substrate, it is to be understood that this means that the hole(s) extend through the substrate so as to form an air passage connecting one side of the substrate to the other, e.g. so that regions on either side of the substrate are in fluid communication through the hole(s). The method of manufacture may comprise etching the one or more holes in the substrate.

The lines of the diffractive optical element(s) may be etched into or deposited on the substrate. Where they are etched, they are preferably non-perforating, i.e. they preferably do not extend fully through the substrate. The lines may be deposited metal lines.

The lines may form a diffraction grating. The lines may be straight, although this is not essential and in some embodiments the lines are curved. For example, the diffractive optical element may be a Fresnel lens.

The Applicant has appreciated that certain advantages may be obtained if the substrate or a portion thereof bearing the diffractive optical element is thin. In a set of embodiments, the substrate comprises a first substrate portion, wherein the at least one diffractive optical element is disposed on or formed in the first substrate portion. The substrate or the first substrate portion may have a thickness of thickness of 1 µm to 20 µm, preferably 2 µm to 10 µm, more preferably 3 µm to 5 µm. In a set of embodiments, one or both of the first and second portions of light impinges on the first substrate portion. In a set of embodiments, at least one of the first and second light paths passes through the first substrate portion.

Having a thin substrate may provide advantages associated with optical transparency, acoustic performance and manufacturability.

Preferably the substrate or the first substrate portion is substantially transparent at the wavelength of the light provided by the light source, e.g. such that the majority of light that impinges on the substrate or the first substrate portion is transmitted after two passes through the substrate (i.e. after entering the substrate, being reflected from a surface of the substrate and passing back through the substrate again). For example, at least 80%, at least 90% or at least 95% of the light may be transmitted after two passes through the substrate. The transparency of the substrate may be achieved by virtue of the substrate of the first substrate portion being sufficiently thin for the light to be transmitted, e.g. the thickness of the substrate or the first substrate portion may be selected to provide a transparency according to the percentages specified above. The substrate or part thereof (e.g. the first substrate portion) may be provided with an anti-reflection coating on one or both sides thereof. Reflections from the substrate surface may thereby be reduced.

The transparency of the substrate or first substrate portion may be wavelength-dependent, and the thickness required to achieve a particular transparency may depend on the material the substrate is made from. Accordingly, the thickness of the substrate or first substrate portion may selected to achieve a particular transparency for the wavelength of the light provided by the light source for a given substrate material. The wavelength of the light provided by the light source may be in the range 800 nm to 1000 nm, e.g. 850 nm or 940 nm. If the wavelength is 850 nm, the substrate or first substrate portion thickness may be about 3 µm if the substrate is made from silicon. At other wavelengths and/or for other materials, the thickness may be less than or greater than 3 µm. For example, if the wavelength of the light is 940 nm, the substrate or first substrate portion thickness may be about 10 µm if the substrate material is silicon.

The use of a thin substrate may advantageously allow the use of substrate materials that would otherwise be too opaque to be used. These materials may provide advantages over conventional materials (e.g. glass) that are transparent even at greater thicknesses, e.g. such as improved manufacturability. For example, the substrate may be made from silicon. Silicon is particularly advantageous as it can be readily and precisely etched to provide the required form of the substrate, e.g. including holes, apertures, and/or perforations as discussed elsewhere herein. Where the substrate (or the first substrate portion) is made from silicon, preferably the silicon is monocrystalline silicon. The silicon may be undoped or doped at a low level such that a suitable substrate transparency (as discussed above) is achieved.

The substrate and/or the first substrate portion may comprise a layered structure (e.g. a sandwich of different materials, e.g including a silicon layer). The layered structure may consist of two, three or more than three layers, e.g. a first layer with a thin film layer on one or both sides. For example, the layered structure may comprise or consist of mono-crystalline silicon (e.g. a 3 µm-thick layer) with a thin film on one or both sides. The thin film may comprise an anti-reflection coating. The thin film may have a high tensile stress (e.g. 1 GPa or higher than 1 GPa), e.g. in order to stiffen the substrate or the first substrate portion.

A thin substrate may also improve the acoustic properties of the optical microphone assembly. For example, holes with a lower aspect ratio (i.e. formed in a thinner substrate) may provide a greater improvement of the acoustic properties of the optical microphone compared with holes of the same shape, size and pattern in a thicker substrate. Holes formed in a thinner substrate may be more easily manufactured.

The optical microphone assembly may comprise more than one diffractive optical element. Each diffractive optical element may introduce a different relative phase delay to light transmitted or reflected by the diffractive optical element. For example, the substrate (or first substrate portion) may have regions of different thickness such that each diffractive optical element has a different height. The displacement of the membrane may thus be measured with respect to a different working point for each diffractive optical element, thereby extending the working range of the optical microphone.

The substrate may comprise a second substrate portion, e.g. surrounding the first substrate portion. The second substrate portion may be thicker than the first substrate portion. This may help to provide rigidity/stiffness for the substrate as a whole, and thus for the first substrate portion. Increased rigidity/stiffness may help to reduce noise, for example, by reducing movement of the substrate (or first substrate portion) which would otherwise contribute to the noise floor.

The substrate may be integrally formed from a single piece of material, such that the first and second substrate portions are made from the same material. For example, the first substrate portion may be a thinned region of the single piece. The method of manufacture may comprise etching a region of the substrate so as to provide a first substrate portion that is thinner than a second substrate potion, e.g, wherein the second substrate portion surrounds the first substrate portion.

The first and second substrate portions may comprise two distinct pieces that are attached together. The first substrate portion may be formed from silicon.

The optical microphone assembly may be arranged such that the first and second portions of light do not impinge on and/or do not pass through the second substrate portion. The second substrate portion may be substantially opaque at the wavelength of light provided by the light source. For example, the second substrate portion may be substantially opaque due to its thickness, e.g. if it is made from the same material as the first substrate portion, due its material or because a covering is provided thereon. As discussed below, the second substrate portion may include apertures or perforations. Accordingly, when it is said that the second substrate portion may be substantially opaque, it is to be understood that this means that the parts of the second substrate portion other than any apertures or perforations are opaque.

The optical microphone assembly may comprise an interstitial volume, wherein the substrate and membrane together define the interstitial volume therebetween. The optical microphone assembly may comprise an acoustic cavity, wherein a first side of the membrane is in fluid communication with the acoustic cavity and a second side of the membrane is in fluid communication with the exterior of the optical microphone assembly.

In a set of embodiments, the substrate comprises an apertured region, the apertured region comprising one or more apertures extending fully through the substrate. For example, the substrate may comprise a plurality of apertures surrounding a central support portion of the substrate, the central support portion comprising the at least one diffractive optical element. The apertured region may be provided in the first substrate portion or in the second substrate portion. The apertures may provide a passage for air connecting the interstitial volume either with the acoustic cavity of the optical microphone assembly or with the exterior of the optical microphone assembly so that these regions are in fluid communication.

Additionally or more typically alternatively, the substrate may comprise a perforated region, the perforated region comprising perforations extending fully through the substrate. The perforated region may be provided in the first substrate portion or in the second substrate portion. The perforated region may provide a passage for air connecting the interstitial volume either with the acoustic cavity of the optical microphone assembly or with the exterior of the optical microphone assembly so that these regions are in fluid communication. This may help to improve the performance of the optical microphone assembly by reducing the acoustic resistance between the membrane and the substrate. The perforated region may be highly perforated, e.g. such that the total area of the perforations comprises greater than 50%, greater than 80%, greater than 90% or greater than 95% of the perforated region. Additionally or alternatively, the perforations may have tessellating shapes, e.g. squares, hexagons, triangles, rectangles. The perforations may be in a lattice arrangement, e.g. square lattice, hexagonal close packed. The perforated region of the second substrate portion may be maximally perforated. In this context, maximally perforated means that the total area of the perforations is maximised as much as practicable while maintaining sufficient structural integrity of the second substrate portion to support the first substrate portion. Maximising the degree of perforation in this way can help to minimise the acoustic resistance between the membrane and the substrate.

It is to be appreciated that the apertures and perforations, where provided, are different from the holes in the first substrate portion and are not for providing the function of removing parts of the diffracted/reflected light. Accordingly, where the perforated region and/or the apertured region is provided in the first substrate portion, neither the apertures nor the perforations overlap with the first or second light path.

Apertures and perforations as described in this context differ in that perforations are typically smaller and more numerous than apertures.

The second substrate portion may be made from a different material from the first substrate portion. Where the perforated region and/or the apertured region is formed in the first substrate portion, the perforated region and/or the apertured region may be made from a different material from the rest of the first substrate potion. The second substrate portion, the perforated region and/or the apertured region may be made from a material that does not transmit light at the wavelength of the light from the light source, e.g.

polysilicon. The method of manufacture may comprise etching perforations in the substrate to form the perforated region.

The shape, size and/or arrangement of the apertures and/or perforations may be selected, e.g. optimized, to increase fluid communication between the interstitial volume and the acoustic cavity or optical microphone assembly exterior, e.g. to reduce or minimise acoustic resistance between the membrane and the substrate.

The optical microphone assembly may comprise a mount structure which supports the membrane and substrate. The mount structure may be a composite structure and may comprise the second substrate portion. The thickness of mount structure may be less than 1 mm, e.g. less than 500 µm, e.g. less than 400 µm.

The membrane may be made from any suitable material, for example, silicon nitride. The membrane may be provided with corrugations, e.g. to increase membrane compliance, although corrugations are not essential. The membrane may be provided with a ventilation hole, although this is not essential. The ventilation hole may allow static equalization of pressure between the acoustic cavity and the microphone assembly exterior.

As discussed above, providing a relatively thin first substrate portion and a thicker second substrate portion, e.g. surrounding the first substrate portion, provides certain advantages. Using a thin first substrate portion opens up the possibility of manufacturing the substrate from materials that would otherwise be too opaque to use, while providing a thicker second substrate portion can provide rigidity to mitigate the effects of noise. Applying this to an arrangement which does not have holes in the first substrate portion is novel and inventive in its own right, and thus when viewed from a second aspect, the invention provides an optical microphone assembly comprising:

- a substrate comprising a first substrate portion and a second substrate portion, wherein the first substrate portion is thinner than the second substrate portion and wherein the first substrate portion is imperforate;
- an interferometic arrangement, the interferometric arrangement comprising a membrane and at least one optical element spaced from the membrane, wherein the at least one optical element comprises a surface of the first substrate portion and/or is disposed on a surface of the first substrate portion, the optical microphone assembly further comprising:
- a light source arranged to provide light to said interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element, wherein at least one of the first and second paths passes through the first substrate portion; and
- at least one photo detector arranged to detect at least part of an interference pattern generated by said first and second portions of light dependent on said optical path difference.

This aspect extends to a method of manufacturing an optical microphone assembly, the optical microphone assembly comprising a substrate, a membrane, a light source and at least one photo detector, the method comprising:

providing a substrate comprising a first substrate portion and a second substrate portion, wherein the first substrate portion is thinner than the second substrate portion and wherein the first substrate portion is imperforate;

providing a membrane and at least one optical element spaced from the membrane to form an interferometric arrangement, wherein the at least one optical element comprises a surface of the first substrate portion and/or is disposed on a surface of the first substrate portion;

arranging a light source to provide light to said interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element, wherein at least one of the first and second paths passes through the first substrate portion; and arranging at least one photo detector to detect at least part of an interference pattern generated by said first and second portions of light dependent on said optical path difference.

In this context, imperforate means that there are no holes extending fully through the first substrate portion. The at least one optical element may be diffractive. Optional features of the optical microphone assembly and method of the first aspect may be optional features of the optical microphone assembly and method of the second aspect, where applicable.

Certain preferred embodiments will now be described, by way of example only, with reference to the accompanying drawings, in which.

Figure 1:
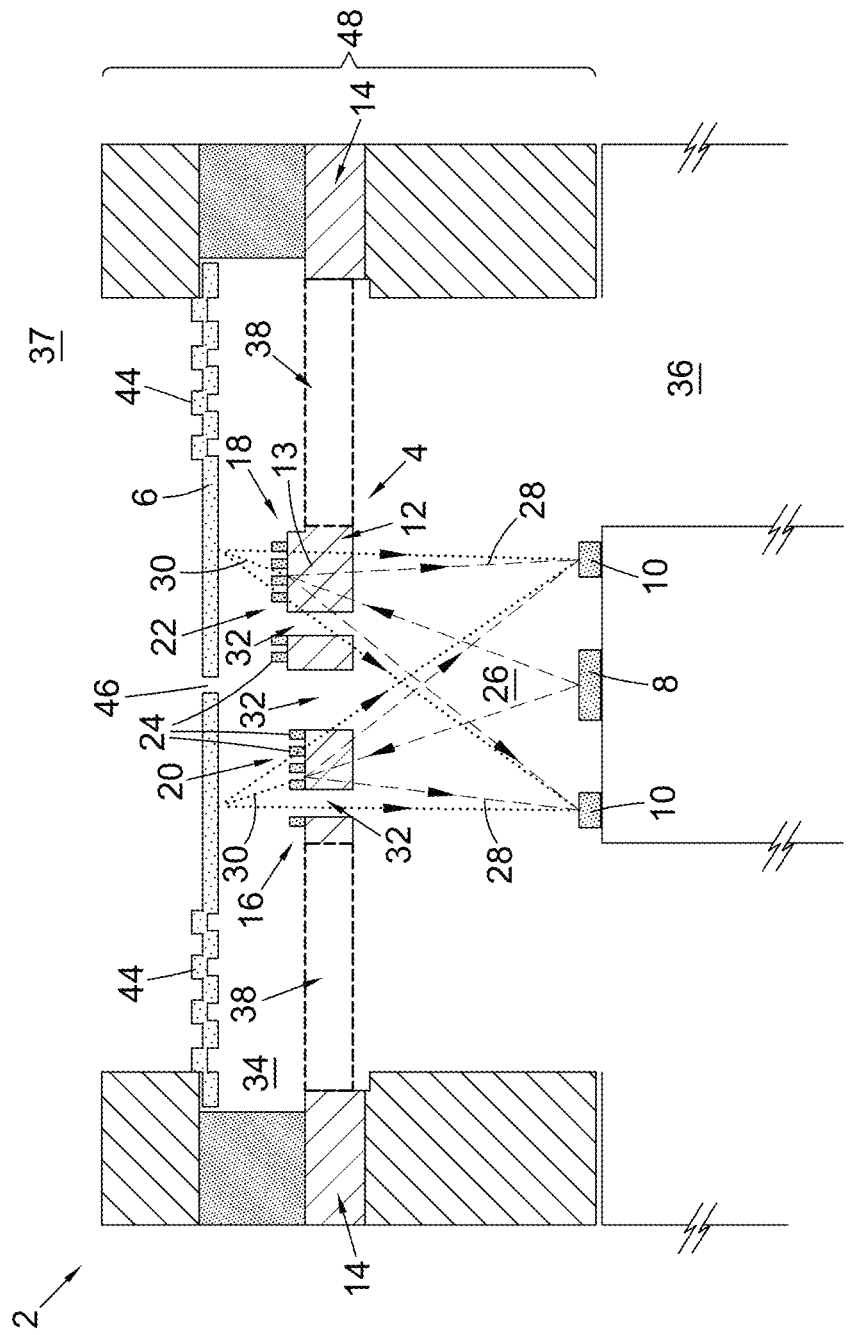
FIG. 1 shows a cross-sectional view of a first embodiment of an optical microphone assembly in accordance with the present invention.

FIG. 1 shows an optical microphone assembly 2 comprising a substrate 4, a membrane 6, a light source 8 and two photo detectors 10. The substrate 4 comprises a first substrate portion 12 generally in the centre thereof and a second substrate portion 14 surrounding the first substrate portion. The substrate is manufactured from silicon. The first substrate portion 12 has a thickness of approximately 3 µm so that the silicon of the first substrate portion 12 is sufficiently thin to be substantially transparent to the wavelength of light provided by the light source 8, which is 850 nm. In this example, a central region 13 of the first substrate portion 12 comprises two sub-portions 16, 18, each being provided with a respective diffractive optical element 20, 22. The diffractive optical elements 20, 22 comprise a plurality of reflective metal lines 24 deposited on the surface of the first substrate portion 12. In this example, the reflective lines are fabricated by depositing and patterning a metal layer, before performing a high-temperature LPCVD (low pressure chemical vapour deposition) processing step to deposit a highly tensile silicon nitride layer over the substrate. This approach would typically use a metal with a high melting point (such as tungsten) in order to withstand the LPCVD deposition step. Alternatively, a tensile film formed with a lower temperature process (e.g. PECVD, plasma-enhanced chemical vapour deposition) may be employed. The LPCVD silicon nitride layer may provide two useful functions. It may function as an anti-reflection coating. It may also help to stiffen the substrate (or first substrate portion) due to its high tensile stress, which may advantageously reduce noise from movement of the substrate (or first substrate portion). However, neither the LPCVD silicon nitride layer nor the PECVD tensile film is essential.

The sub-portions 16, 18 have different thicknesses so as to introduce different phase delays to light passing therethrough. This provides two different working points with respect to which the membrane displacement is measured, which extends the working range of the optical microphone. However, this feature is not essential, and in variations on this embodiment and other embodiments, the first substrate portion 12 may have a uniform height and a single diffractive optical element.

The light source 8, which in this example is a vertical-cavity surface-emitting laser (VCSEL), directs light 26 towards the first substrate portion 12. A first portion 28 of the light is reflected back from the diffractive optical elements 20, 22, and is incident on the detectors 10. A second portion 30 of the light is transmitted and diffracted by the diffractive optical elements 20, 22 and is incident on the membrane 6. The second portion 30 of light is reflected by the membrane 6, and propagates back through the first substrate portion 12 and is incident on the detectors 10. The first and second portions 28, 30 of light together create an interference pattern at the detectors 10. The interference pattern depends on the separation between the membrane 6 and the diffractive optical elements 20, 22. The measured intensity of light at the detectors 10 is used to determine the separation between the membrane 6 and the diffractive optical elements 20, 22, and thus to generate an output signal corresponding to the movement of the membrane 6.

A plurality of holes 32 is provided in the first substrate portion 12. The plurality of holes 32 performs two functions. First, the holes 32 interrupt the optical paths taken by the light 26 and the first and second portions 28, 30 of light. The holes 32 therefore cause part of the light to be removed, such that it does not contribute to the interference pattern at the detectors. The light that is removed includes, for example, portions that contribute negatively to the optical signal strength and contrast.

The holes 32 also serve as air passages such that an interstitial volume 34 between the substrate 4 and the membrane 6 is in fluid communication with an acoustic cavity 36 of the optical microphone assembly 2. The air passages provided by the holes 32 allow air that is displaced by movement of the membrane to flow out of the interstitial volume, thereby reducing acoustical squeeze-film resistance that may otherwise give rise to noise in the optical microphone output signal.

In this example, the optical microphone assembly is shown as having a "top-port" configuration, i.e. wherein the acoustic cavity 36 is provided underneath the substrate 4, and the side of the membrane 6 facing away from the substrate 4 is in fluid communication with the exterior of the optical microphone 37. However, the optical microphone assembly may also be suitable for use in a "bottom-port" configuration, i.e. with an acoustic cavity enclosing a volume on the side of the membrane 6 that faces away from the substrate 4. In such arrangements, the interstitial volume 34 would be in fluid communication with the exterior of the optical microphone assembly via the holes 32.

Figure 2:
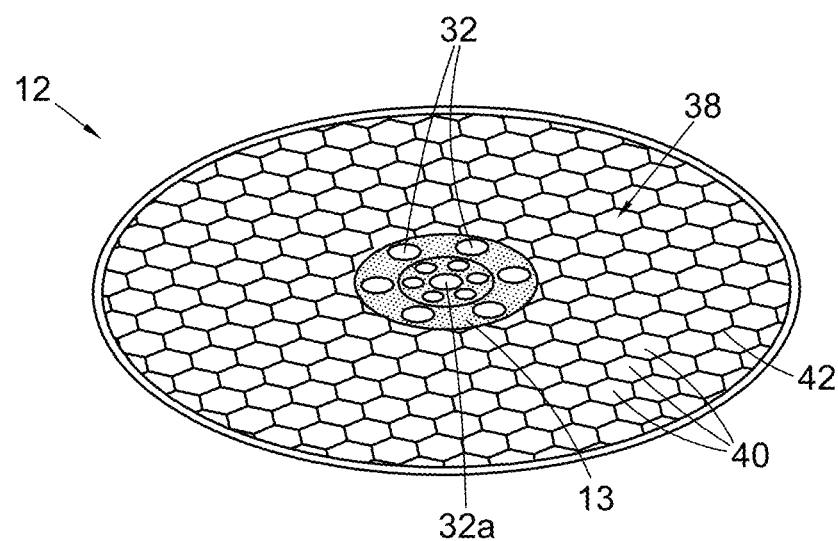
FIG. 2 shows a perspective view of part of the substrate of the optical microphone assembly of FIG. 1.

As shown in perspective view in FIG. 2, the first substrate portion 12 comprises a perforated region 38, which surrounds a central region 13 of the first substrate portion 12. It can be seen that the holes 32 provided in the central region 13 of the first substrate portion 12 are arranged in concentric circles around a central hole 32a. The perforated region 38 comprises hexagonal perforations 40. The hexagonal perforations 40 are arranged in a hexagonal close-packed lattice arrangement. The perforations 40 occupy a large fraction of the area of the perforated region 38—in this example, the maximum area practicable while still maintaining sufficient structural integrity from the material 42 between the holes to support the central region 13 of the first substrate portion 12. The perforated region 38 provides air passages via which the interstitial volume 34 is in fluid communication with the acoustic cavity 36. This helps further to eliminate squeeze-film damping of the membrane and thereby to improve the performance of the optical microphone.

Returning to FIG. 1, it can be seen that the membrane 6 is provided with corrugations 44, which help to increase the membrane compliance and thus to increase the optical microphone sensitivity. The membrane 6 also comprises a central ventilation hole 46. This allows static equalization of pressure between the acoustic cavity and the microphone assembly exterior.

The optical microphone assembly 2 also comprises a mounting structure 48, which comprises the second substrate portion 14. It can be seen that the mounting structure 48 is a composite structure comprising circumferential structures that support the membrane 6 and the first substrate portion 12. It can be seen that the mounting structure 48 is thicker than the first substrate portion 12. In this example, the mounting structure 48 is 400 μm thick. It will be appreciated that the dimensions of FIG. 1 are not shown to scale. The thickness of the mounting structure 48 provides rigidity to reduce noise (e.g. thermo-mechanical noise) that may otherwise be caused by movement of thin first substrate portion 12.

Figure 3:
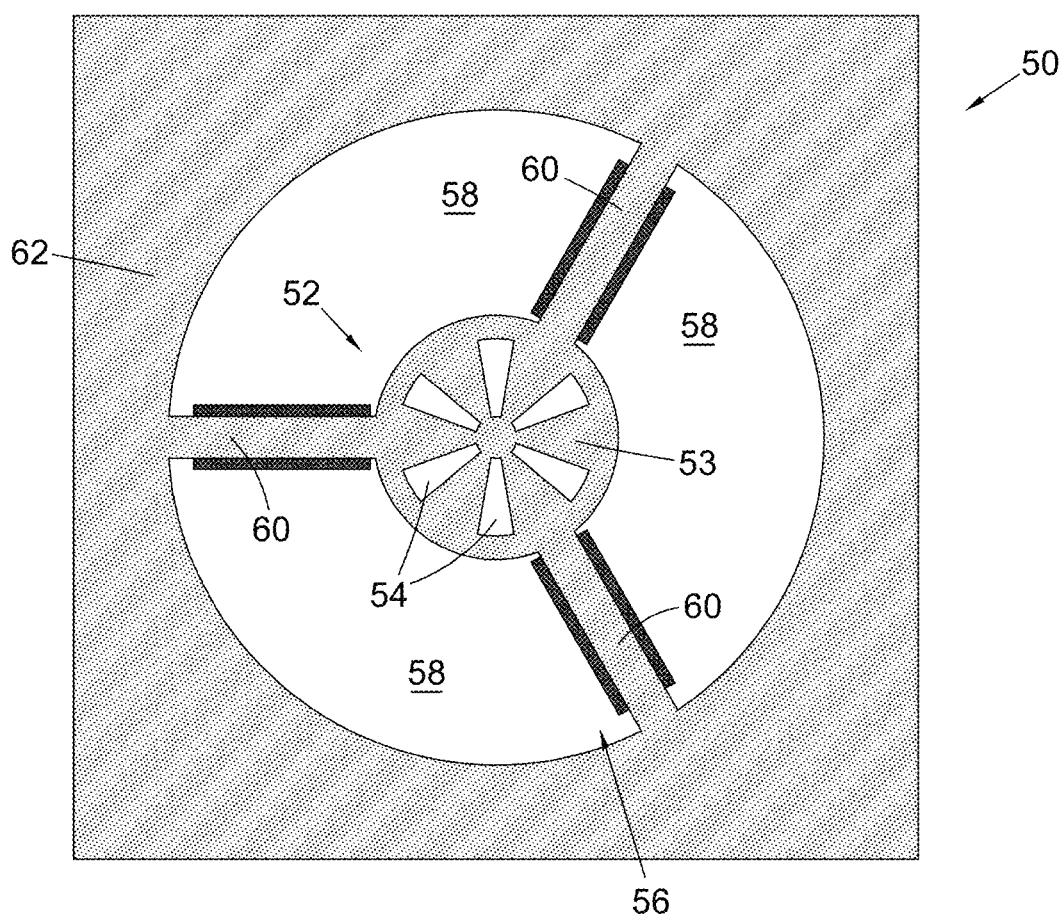
FIG. 3 shows an alternative substrate for use in optical microphone assemblies in accordance with the present invention.

FIG. 3 shows an alternative substrate 50 that may be used in optical microphone assemblies in accordance with the present invention, for example, in the optical microphone assembly 2 shown in FIG. 1. The substrate 50 comprises a first substrate portion 52 having a diffractive optical element (not shown) disposed on a central region 53 thereof. The central region 53 has holes 54 therethrough. The holes 54 are elongate and extend radially from a central point on the first substrate portion 52. The holes 54 perform an equivalent function to the holes 32 shown in FIGS. 1 and 2.

The substrate 50 comprises an apertured region 56. The apertured region 56 has three apertures 58 that extend fully through the substrate 50. The apertures 56 are arc-shaped sections surrounding the central region 53, such that the central region 53 has the form of central support platform supported by three radially extending beams 60. In an optical microphone assembly, e.g. such as the assembly 2 in FIG. 1, the apertures 50 perform a similar function to the perforations 40 shown in FIG. 2, i.e. putting an interstitial volume in fluid communication with an acoustic cavity. The substrate 50 also includes a second substrate portion 62, which is thicker than the first substrate portion 52 and forms part of a mounting structure when the substrate 50 is assembled in an optical microphone assembly. In this example, the beams 60 have the same thickness as the central region 53, although in variations on this and other embodiments, the beams 60 may be thicker than the central region 53, e.g. forming part of and having the same thickness as the second substrate portion 62.

Figure 4:
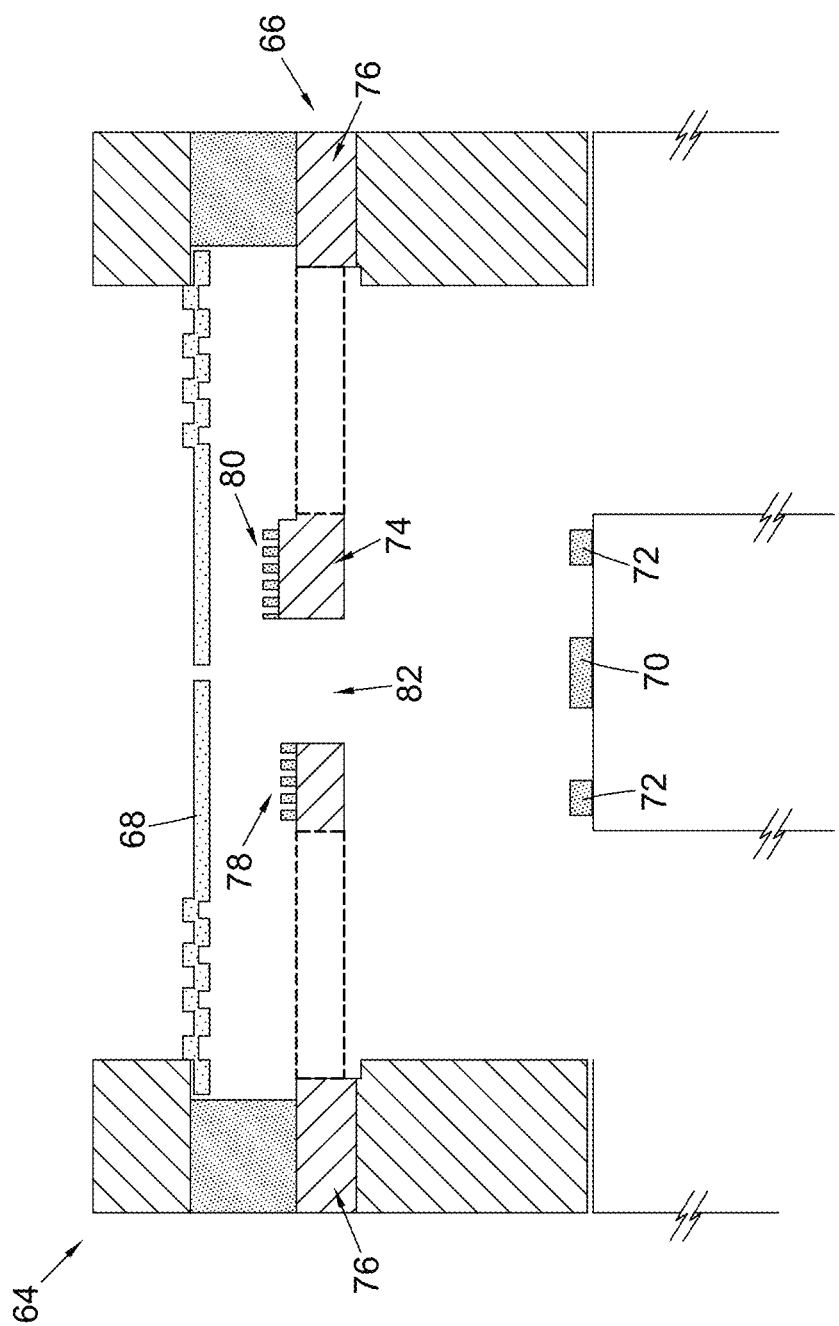
FIG. 4 shows a cross-sectional view of a second embodiment of an optical microphone assembly in accordance with the present invention.

FIG. 4 shows a second embodiment of an optical microphone assembly 64. The optical microphone assembly 64 has equivalent features to the optical microphone assembly 2 shown in FIG. 1, i.e. a substrate 66, a membrane 68, a light source 70 and two detectors 72. The substrate 66 comprises a first substrate portion 74 and second substrate portion 76, the first substrate portion 74 having diffractive optical elements 78, 80 thereon. However, instead of the plurality of holes 32, a single central hole 82 is provided. The hole 82 provides a similar function to the holes 32 of the embodiment of FIG. 1, except that due its different position, it removes a different portion of the light from the light source 8. The hole 82 therefore has a different impact on the interference pattern detected at detectors 72 compared with the arrangement shown in FIG. 1.

Figure 5:
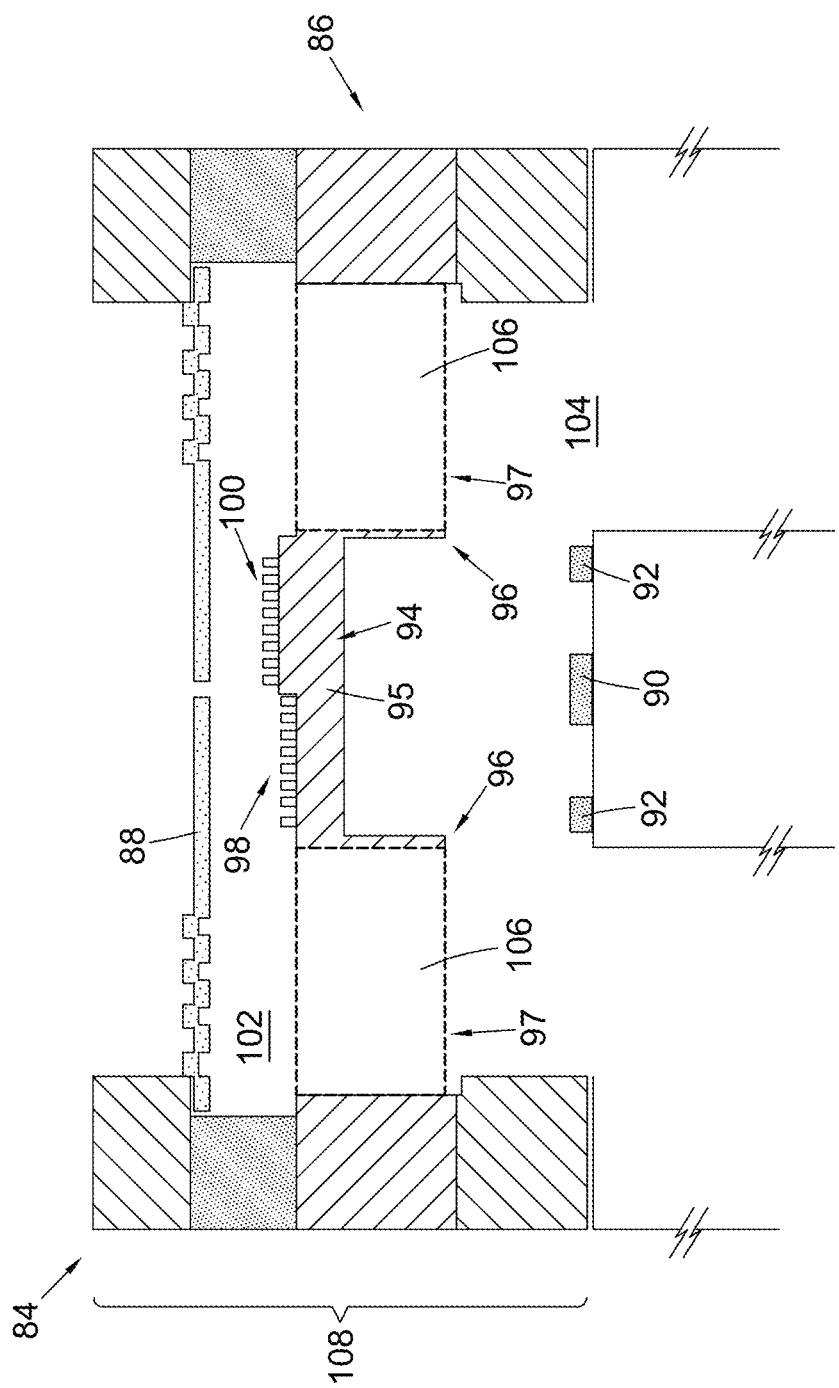
FIG. 5 shows a cross-sectional view of a third embodiment of an optical microphone assembly in accordance with the present invention.

FIG. 5 shows a third embodiment of an optical microphone assembly 84. The optical microphone assembly 84 has equivalent features to the optical microphone assembly 2 shown in FIGS. 1 and 4, i.e. a substrate 86, a membrane 88, a light source 90 and two detectors 92. The substrate 86 comprises a first substrate portion 94 and second substrate portion 96, the first substrate portion 94 comprising a central region 95 having diffractive optical elements 98, 100 thereon. However, in this embodiment, no holes are provided in the central region 95 of the first substrate portion 94. In addition, the first substrate portion 94 comprises only the central region 95, and the second substrate portion 96 (which is thicker than the first substrate portion 94) includes a peripheral region 97 which surrounds the central region 95 and has apertures 106 formed therein. An interstitial volume 102 is in fluid communication with an acoustic cavity 104 via the apertures 106. The apertures 106 have a similar form to the apertures 50 shown in and discussed with reference to FIG. 3, except that in this example the beams 60 form part of the second substrate portion 96, and so are thicker than the first substrate portion 94 (although this is not essential). In variations on this embodiment, a perforated region similar to perforated region 38 of FIGS. 1 and 2 may be provided instead of the apertures 106. The substrate 86 is made from silicon which, due to having a thickness of 3 µm, is substantially transparent to the light emitted by the light source 90, which in this example has a wavelength of 850 nm, i.e. the substrate 86 is transparent by virtue of being sufficiently thin. Using silicon for the substrate 86 is advantageous because silicon is readily and precisely etched, allowing the apertures 106 (or perforations in variations on this embodiment) to be etched in the substrate 86.

The optical microphone assembly 84 comprises a mounting structure 108 which comprises the second substrate portion 96. The mounting structure 108 and the second substrate portion 96 are much thicker than the first substrate portion 94. In this example, the mounting structure (not shown to scale) is 400 µm thick. The mounting structure 108 and the second substrate portion 96 provide rigidity to reduce noise resulting from movement of the first substrate portion 94.

It will be appreciated that only some embodiments of the present invention have been described above, and that other embodiments and variations on the above-described embodiments are possible within the scope of the invention. The scope of the invention is defined by the appended claims.

The invention claimed is:
1. An optical microphone assembly comprising:
a substrate comprising a first substrate portion and a second substrate portion, wherein the first substrate portion is thinner than the second substrate portion;
an interferometic arrangement, the interferometric arrangement comprising a membrane and at least one optical element spaced from the membrane, wherein the at least one optical element comprises a surface of the first substrate portion and/or is disposed on a surface of the first substrate portion, and wherein the at least one optical element does not comprise a diffractive optical element that is formed as a plurality of holes through the first substrate portion, the optical microphone assembly further comprising:
a light source arranged to provide light to said interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element, wherein at least one of the first and second paths passes through the first substrate portion; and
at least one photo detector arranged to detect at least part of an interference pattern generated by said first and second portions of light dependent on said optical path difference.

2. The optical microphone assembly of claim 1, wherein the first substrate portion does not comprise any holes that overlap with either or both of the first and second light paths.

3. The optical microphone assembly of claim 1, wherein the first substrate portion does not comprise any holes.

4. The optical microphone assembly of claim 1, wherein the at least one optical element comprises a diffractive optical element that is not formed as a plurality of holes through the first substrate portion.

5. The optical microphone assembly of claim 1, wherein the at least one optical element comprises a diffractive optical element comprising a plurality of lines formed in or disposed on a surface of the first substrate portion; wherein the lines are deposited on the first substrate portion or wherein the lines are etched into the first substrate portion and do not extend fully through the first substrate portion.

6. The optical microphone assembly of claim 1, wherein the first substrate portion has a thickness of 1 µm to 20 µm.

7. The optical microphone assembly of claim 1, wherein the substrate or the first substrate portion is substantially transparent at the wavelength of the light provided by the light source.

8. The optical microphone assembly of claim 1, wherein the substrate or the first substrate portion is provided with an anti-reflection coating on one or both sides thereof.

9. The optical microphone assembly of claim 1, wherein the substrate or the first substrate portion is made from silicon.

10. The optical microphone assembly of claim 1, wherein the substrate or the first substrate portion comprises a layered structure, wherein the layered structure consists of two, three or more than three layers.

11. The optical microphone assembly of claim 1, wherein the second substrate portion surrounds the first substrate portion.

12. The optical microphone assembly of claim 11, wherein the substrate is integrally formed from a single piece of material, wherein the first substrate portion is a thinned region of the single piece.

13. The optical microphone assembly of claim 1, wherein the optical microphone assembly is arranged such that:
   i) the first and second portions of light do not impinge on the second substrate portion; or
   ii) the first and second portions of light do not pass through the second substrate portion; or
   iii) the first and second portions of light do not impinge on and do not pass through the second substrate portion.

14. The optical microphone assembly of claim 1, further comprising an interstitial volume wherein the substrate and membrane together define the interstitial volume therebetween, and wherein the optical microphone assembly further comprises an acoustic cavity, wherein a first side of the membrane is in fluid communication with the acoustic cavity and a second side of the membrane is in fluid communication with an exterior of the optical microphone assembly.

15. The optical microphone assembly of claim 14, wherein the substrate comprises an apertured region comprising one or more apertures extending fully through the substrate, wherein the apertures provide a passage for air connecting the interstitial volume either with the acoustic cavity of the optical microphone assembly or with the exterior of the optical microphone assembly.

16. The optical microphone assembly of claim 15, wherein the first substrate portion comprises the apertured region.

17. The optical microphone assembly of 14, wherein the substrate comprises a perforated region comprising perforations extending fully through the substrate, wherein the perforated region provides a passage for air connecting the interstitial volume either with the acoustic cavity of the optical microphone assembly or with the exterior of the optical microphone assembly.

18. The optical microphone assembly of claim 17, wherein the perforations have a total area which comprises greater than 50% of the perforated region.

19. A method of manufacturing an optical microphone assembly, the optical microphone assembly comprising a substrate, a membrane, a light source and at least one photo detector, the method comprising:
   providing a substrate comprising a first substrate portion and a second substrate portion, wherein the first substrate portion is thinner than the second substrate portion;
   providing a membrane and at least one optical element spaced from the membrane to form an interferometric arrangement, wherein the at least one optical element comprises a surface of the first substrate portion and/or is disposed on a surface of the first substrate portion, and wherein the at least one optical element does not comprise a diffractive optical element that is formed as a plurality of holes through the first substrate portion;
   arranging a light source to provide light to said interferometric arrangement such that a first portion of said light propagates along a first optical path via said interferometric arrangement and a second portion of said light propagates along a second different optical path via said interferometric arrangement, thereby giving rise to an optical path difference between the first and second optical paths which depends on a distance between the membrane and the optical element, wherein at least one of the first and second paths passes through the first substrate portion; and
   arranging at least one photo detector to detect at least part of an interference pattern generated by said first and second portions of light dependent on said optical path difference.

20. The method of claim 19, wherein the at least one optical element comprises a diffractive optical element comprising a plurality of lines formed in or disposed on a surface of the first substrate portion, the method comprising depositing the lines on the first substrate portion or etching the lines into the first substrate portion such that the lines do not extend fully through the first substrate portion.

* * * * *